United States Patent [19]

Matson

[11] Patent Number: 4,516,902
[45] Date of Patent: May 14, 1985

[54] BUMPER APPARATUS FOR LOW BED TRAILER

[75] Inventor: Donald F. Matson, Mitchell, S. Dak.

[73] Assignee: Western AG-Sales Inc., Mitchell, S. Dak.

[21] Appl. No.: 410,488

[22] Filed: Aug. 23, 1982

[51] Int. Cl.³ .............................................. B60P 1/28
[52] U.S. Cl. .................................. 414/480; 414/483; 414/484
[58] Field of Search ............................... 414/477–479, 414/480, 537, 482–485

[56]  References Cited
 U.S. PATENT DOCUMENTS 2,462,868  3/1949  Ives ................................. 414/484 X
4,305,694  12/1981  Chan .................................. 414/482

FOREIGN PATENT DOCUMENTS 1450337  9/1976  United Kingdom ................ 414/537

Primary Examiner—Joseph E. Valenza
Assistant Examiner—David A. Bucci
Attorney, Agent, or Firm—Andrus, Sceales, Starke & Sawall

[57]  ABSTRACT

A low bed trailer includes a bumper/ramp unit pivotally attached to the back end. The bed is centrally pivoted to a wheel support unit for tilting to a loading position under gravity forces. A mechanical linkage between the bed and bumper/ramp unit provides automatic positioning of the bumper/ramp unit in response to the positioning of the bed between a horizontal transport position and a tilted loading position. In the bumper position, the bumper depends from the trailer bed and in the tilted loading position, the bumper abuts the trailing end of the bed and projects angularly to the ground as an inclined ramp.

12 Claims, 6 Drawing Figures

BUMPER APPARATUS FOR LOW BED TRAILER

BACKGROUND OF THE PRESENT INVENTION

This invention relates to a bumper/ramp unit for a low bed trailer having a trailer bed adapted to be tilted to a loading position and particularly to such a trailer including an actuating mechanism interconnecting the bumper/ramp unit to the trailer bed for conjoint actuation.

A low bed trailer having a hitch mechanism is used for transport of loads over the road. The trailer includes a flat bed supported on a wheel assembly and the hitch mechanism which is adapted to be releasably coupled to a tractor. For convenient loading, the bed is conveniently formed to pivot about its supporting wheel structure which permits dropping of the trailing or back end of the trailer from the usual horizontal trailing position. The back end of the trailer is preferably provided with a bumper structure to protect the trailer. Such a bumper structure, however, may generally limit the lowering of the trailer for loading and the like.

The bumper structure is secured to the back end of the trailer slightly below the level of the trailer bed. The bumper may, of course, be adjustably mounted to permit convenient positioning of the trailer bed. For example, a trailer structure having a multiple part bed including an elongated tailgate and a pivoted bumper structure is disclosed in U.S. Pat. No. 4,305,694 which issued Dec. 15, 1981. In that system, the trailer bed includes an outer tailgate extension with the bumper structure pivotally secured to the aft end of the extension. A special hydraulic mechanism is provided for separately and individually raising and lowering of the bumper section in synchronism with the powered positioning of the tailgate. In the lowered position, the bumper section functions as a bumper while in the raised position, the bumper section functions as a further planar extension of the tailgate extension. Other adjustable mounted bumpers are shown in U.S. Pat. Nos. 3,533,654 and 3,695,666.

Although systems have therefore been provided for and provide operative bumper systems, there is a need for a simple, reliable and relatively inexpensive mechanism for proper positioning of a bumper section for trailering and for loading.

SUMMARY OF THE PRESENT INVENTION

The present invention relates to a low bed trailer having an improved bumper/ramp unit interconnected to the trailering end of the tiltable low bed trailer and automatically positioned between a depending bumper position and a raised ramp position, with a mechanical interlatching mechanism coupled between the pivoting bed structure and the bumper/ramp unit to provide such proper and automatic positioning of the bumper/ramp unit. More particularly and in a particularly practical approach and construction, the bumper/ramp unit generally includes plate-like bumper which is pivotally attached to the trailering end of the low bed trailer. The plate-like bumper is positionable in a depending position where it is located below and slightly rearwardly of the back lighting panel of the trailer bed. In the raised position, the bumper abuts the trailing end of the bed and projects outwardly therefrom as an inclined ramp. A mechanical linkage is coupled to the bumper and extends forwardly beneath the trailer bed to a pivot coupling mechanism between the trailer bed and the trailer wheel assembly. The bed is pivotally mounted and may be manually movable by the operator between a horizontal over-the-road position and a backwardly tilted loading position as a result of the mounting and gravity forces acting on the bed. In a particularly practical embodiment, the bumper/ramp unit linkage includes a pivoting connection between the bed and the wheel assembly. A pivot arm is secured to the pivot support of the bumper and is interconnected to the trailer bed pivoting connection by a transfer link to automatically provide extension of the bumper in response to pivoting of the bed structure from the horizontal transport position to the tilted loading position. The linkage of course operates in the opposite direction to simultaneously lower and reset the bumper to the bumper position in response to and in timed relation with the return pivoting of the trailer bed to the horizontal transport position. In one alternate embodiment, the forward end of the trailer may include an integrated fifth wheel with a short bed extension. The main bed extends rearwardly from such short bed over the wheel support structure to the trailer bumper/ramp unit.

The mechanical linkage thus may be a simple, reliable structure using rugged mechanical elements. Further, such a mechanical linkage can not only be readily constructed but is readily understood and maintained.

DESCRIPTION OF THE DRAWING FIGURES

The drawings furnished herewith illustrate a preferred construction of the present invention in which the above advantages and features are clearly disclosed as well as others which will be readily understood from the following description.

DESCRIPTION OF THE PREFERRED EMBODIMENTS

Figure 1:
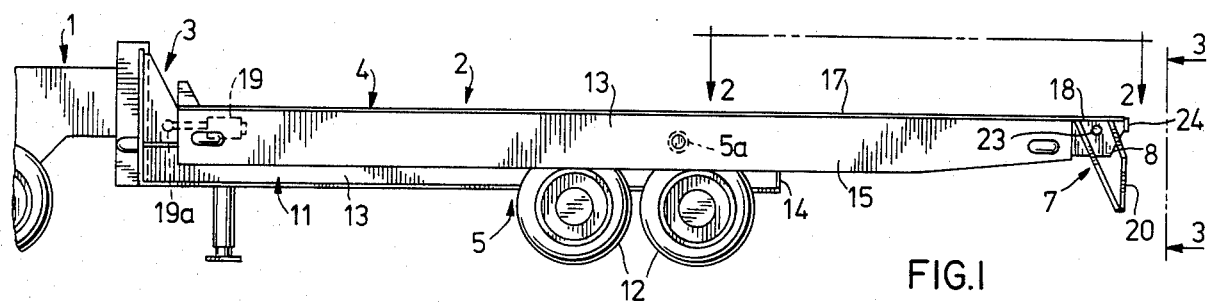
FIG. 1 is a side elevational view of a low bed trailer coupled to a tractor and including a bumper/ramp unit constructed in accordance with the teaching of the present invention.
Figure 3:
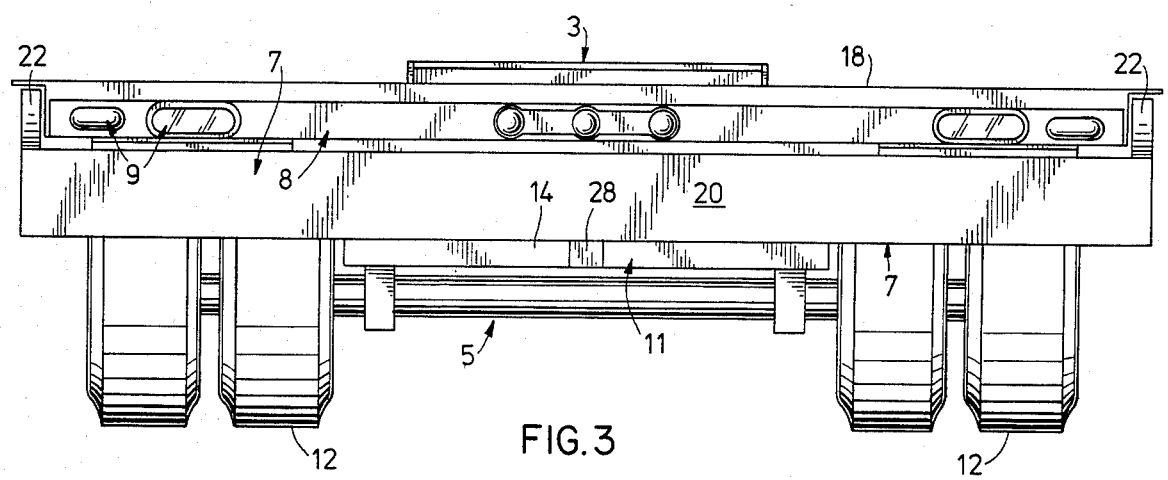
FIG. 3 is an end elevational view of the trailer unit shown in FIG. 1.
Figure 2:
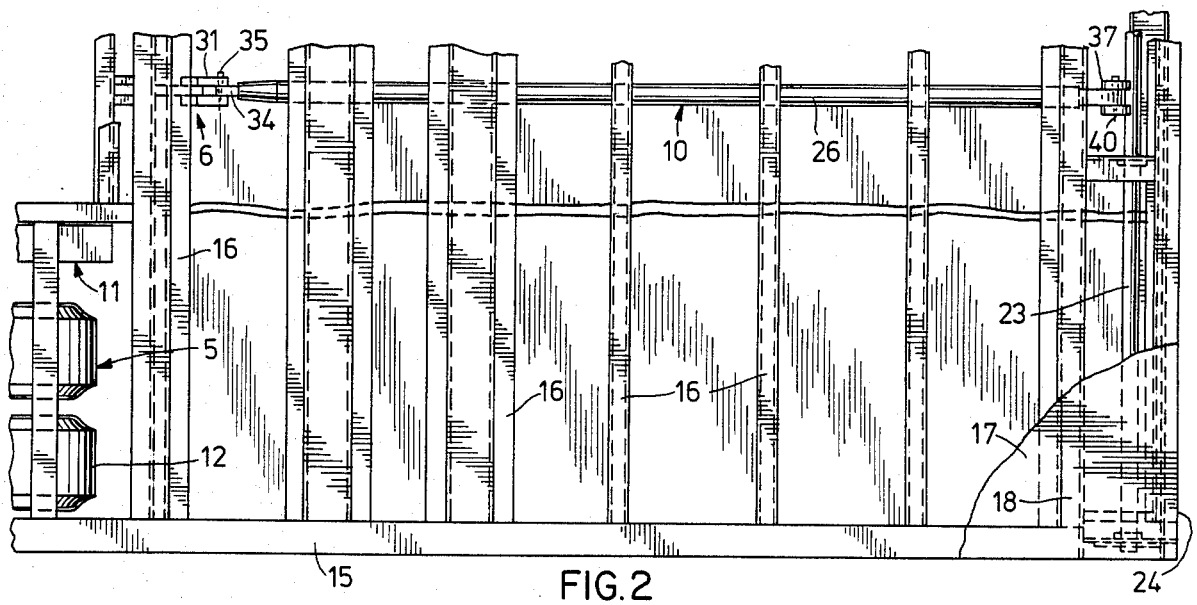
FIG. 2 is a plan view with parts broken away and sectioned to illustrate a mechanical linkage for positioning of the bumper/ramp unit.

Referring to the drawing and particularly to FIGS. 1 and 2, the present invention is illustrated in a well known tractor-trailer assembly including a conventional semi-trailer truck-tractor 1 with a low bed trailer 2 releasably interconnected to the back end thereof. A suitable releasable hitch mechanism 3 is provided with a complementing hitch unit on the leading end of the trailer of the low bed trailer and the back end of the truck for the releasable interconnection therebetween. The truck and the hinged mechanism may be of any suitable or desired construction and no further description thereof is given other than necessary to a clearful understanding of the present invention.

The trailer 2 is illustrated as a low bed trailer having a platform or bed 4 defining an elongated flat support which is interconnected to and supported upon a wheel assembly 5 for rolling support of the trailer. Bed 4 is pivotally secured to wheel assembly 5 by a pivot shaft 5a and is adapted to be tilted to a loading position as shown in phantom in FIG. 6 for loading of the trailer. As shown most clearly in FIGS. 1 and 5, a pivot linkage 6 between the bed 4 and the wheel assembly is coupled to power a back bumper/ramp unit 7 attached to the rear end of the trailer bed 4. The bumper/ramp unit 7 is shown in the depending position located immediately beneath the back lighting panel 8 of the trailer. The panel 8 includes the conventional lighting system such as the trailer brake and stop light assemblies, warning light assemblies 9 and the like.

Figure 5:
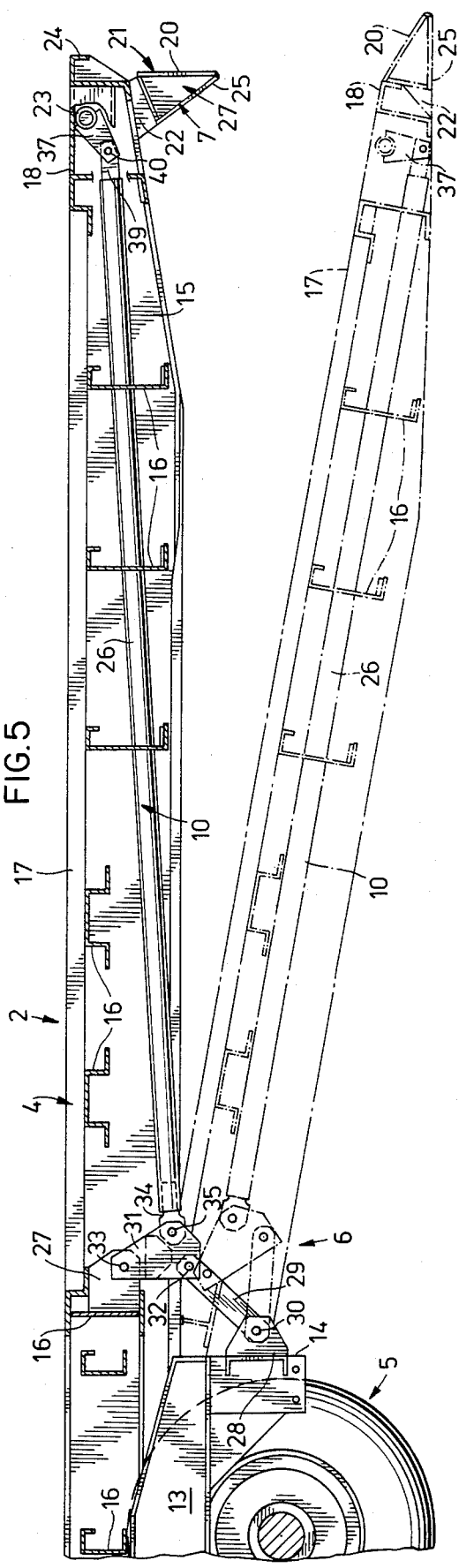
FIG. 5 is an enlarged longitudinal sectional view of the back half of the low bed trailer shown in FIGS. 1-4 with the transport position in full and the tilted loading position in phantom to more clearly illustrate the mechanism of the present invention.

The bumper/ramp unit 7 is adapted to be pivoted upwardly into alignment with the trailering most end of the bed 4 to form an extension thereof, as shown in FIG. 5. The extended position is established with bed 4 in an inclined loading position. The bumper/ramp unit 7 then forms a slight angled or inclined entrance portion onto the bed in the loading position.

Figure 4:
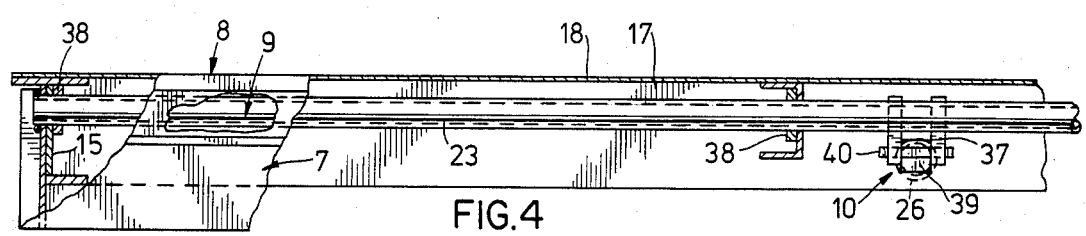
FIG. 4 is a fragmentary enlarged view of the bumper/ramp unit with parts broken away in section to show detail of construction.

The linkage 6 is connected by a mechanical linkage 10, as most clearly shown in FIGS. 4 and 5, to the bumper/ramp unit and is arranged to provide for the proper positioning of the bumper/ramp unit 7 between the bumper position, shown in FIGS. 1 and 5 and the ramp position shown in FIG. 5. The mechanical linkages 6, 10 are a simple, rugged and reliable mechanism for assuring proper positioning and locking of the bumper ramp unit in the desired position. The bumper ramp unit 7 and/or the linkage may of course be provided with any suitable shock absorbing means or the like to absorb the initial forces of interengagement between the bumper unit and other loads, while maintaining protection for the trailing end of trailer.

More particularly in the illustrated embodiment of the invention, the wheel assembly 5 includes a frame 11 having a plurality of vehicle wheels 12 to support the trailer. The frame particularly includes a pair of side beams 13 interconnected by a back cross beam 14. The forward end of the frame side beams 13 angled toward each other to the hitch point 3. The trailer bed 4 includes an underframe of suitable I-beams or the like, with side beams 15 extending longitudinally for the length of the bed and interconnected by suitable cross beams 16. A top platform or deck 17 is secured to the bed frame structure which is formed with channel edge supports 18 within which replaceable deck 17 is secured. The bed frame is substantially longer than the wheel frame and in the horizontal travel position cross beams 16 are aligned with and rest on the side beams 13 of the wheel frame. The bed 4 thus extends rearwardly of the wheeled unit 5. The pivot unit 6 is connected between a bed cross-beam 16 and the back cross-beam 14 of the wheel frame.

The pivot unit 5a pivotally supports the bed 4 for movement between the horizontal transport position and the rearwardly tilted or pivoted loading position, shown in FIG. 5. The forward end of the trailer bed unit 4 is coupled to the wheel frame by a mechanical positioning linkage 19 including a manually operable lever 19a. The lever 19a is pivotal between a horizontal position and a vertical position. In the horizontal position, the linkage 19 pulls the forward end of the bed downwardly where the bed resting on the wheel frame latches the bed in the transport position. Raising of the lever to the vertical position expands the linkage and provides a positive upward movement on the forward end of the bed. The bed 4 is reasonably balanced about support 5a and pivots about the pivot support 5a with the assistance of the force of gravity between the loading position and trailering positions.

The bumper/ramp unit 7 is pivotally mounted to the trailering end of the bed frame and the pivot linkage 10 connects to pivot linkage 6 of the bed for automatic positioning of the unit 7 as the bed pivots between the horizontal and tilted positions.

More particularly, the bumper unit 7 includes a bumper plate 20 secured as the one face of a triangular shaped beam 21. The width of the beam 21 essentially corresponds to the width of the bed 4. A pivot arm 22 is similarly secured one each to the opposite ends of the bumper beam 21. The arms are generally U-shaped channel members, and are pivotally coupled to the trailer end of the bed frame 9, as by a pivot shaft 23. The pivot shaft 23 is set inwardly of the bed structure and locates the outer edge of the plate beneath and generally aligned with the tailgate plate and inwardly of the outer end 24 of the deck frame 18. The outer ends of the arms 22 are formed as V-shaped members having the apex at the outermost end thereof. The bumper plate 20 is secured between the outer V-shaped face of the arms, with the plate 20 extending over and interconnected thereto. In the trailering bumper position, the arms 22 are located at a small angle to the vertical and the horizontal to locate the bumper plate 20 in a true vertical position. In the extended ramp and tilted bed position, the triangular V-shaped beam provides for ground supporting engagement of the underside 25 of the beam, and with the bumper plate 20 defining a ramp from the ground to the bed 4.

The bumper/ramp linkage 10 provides for the appropriate positioning and in the illustrated embodiment of the invention includes a motion transfer link 26 interconnected between the pivot linkage 6 of the bed 4 and the pivot shaft 23 of the bumper/ramp unit 7 via a coupling arm 37 as hereinafter described.

More particularly, the bed pivot linkage 6 includes a pivot bracket 27 rigidly affixed as by a weld to the center of a cross beam 16 of the bed frame. A pivot bracket 28 is also welded or otherwise affixed to the back cross beam 14 of the wheel assembly 5 in alignment with bracket 27. A connecting link 29 is pivotally coupled to the frame bracket 28 as by a pivot bolt 30. The outer end of the pivot link 29 is pivotally connected to the lower end of a bifrucated coupling plate 31, as by a pivot bolt unit 32. The opposite end of the bifrucated plate 31 is pivotally secured as by a bolt unit 33 to the pivot bracket 27 of the trailer bed 4. In the horizontal bed position, the pivot connections 30 and 32 are substantially aligned in a vertical plane.

The plate 31 extends rearwardly between the center of the pivot connections 30, 32 with the bed in the horizontal trailering position. The adjacent end of the forced transmitting rod 26 includes a pivot pin member 34 which projects into and is secured to the rear portion of plate 31 as by a pivot bolt unit 35. The rod 26 extends rearwardly to a connection to the shaft 23.

The ramp actuating linkage includes the pivot shaft 23 affixed to the trailer side beams 15 at the back end of the trailer bed. As shown most clearly in FIG. 4, pivot bushings 38 are secured to the bed frame rear beam 15 beneath the top frame plate member 18. The bushings 38 are provided at the opposite ends and at intermediate positions of the bumper unit 7, with the shaft 23 journaled therein. The coupling arm 37 is affixed to the shaft 23 centrally of the trailer bed 4 and in alignment with the transfer rod 26. The outer end of the transfer rod 26 includes a coupling pin 39 projecting into the arm 37 and is secured thereto by a suitable pivot bolt unit 40. In the horizontal transport position, the pivot arm 37 extends forwardly and downwardly within the trailer bed frame, as shown in full in FIG. 5.

The arm or rod 26 extends from pivot unit 6 rearwardly and upwardly beneath bed 4, passing through appropriate openings 36 in the beams 16 where required. The outer end of rod 26 is pivotally attached to the arm 37 on pivot shaft 23. As the bed 4 pivots from the horizontal transport position to the tilted position, the arm 29 and plate 31 of linkage 6 collapse, with the pivot arm 29 pivoting downwardly and outwardly toward the rear of the trailer 2. The coupling plate 31 also pivots oppositely and toward the front of the trailer with the top pivot 33 moving with bed 4. The rod-connected pivot connection 35 is thereby moved toward the rear of the trailer with the transfer arm or rod 26 moving rearwardly and downwardly to actuate the bumper/ramp connector unit pivot linkage. Thus, as the trailer bed 4 pivots from the horizontal transport position, the pivot connection collapses, thereby causing the rearward and downward movement of rod 26 which forces a corresponding pivoting of the arm 37 and attached shaft 23. The shaft 23, which is firmly affixed to the bumper/ramp unit arms 22, causes them to pivot in a corresponding direction, thereby moving the bumper plate 20 outwardly into angled alignment with the deck 17 and the rear edge member 18 in the illustrated embodiment. With the trailer bed 4 pivoted to the full tilted position, the bumper plate 20 is aligned as a continuation and angled extension of deck 17. The lower side 25 of the triangular-shaped bumper beam rests on the ground, as an extension of the underside portion of the bed frame, as shown in FIG. 5 in phantom.

Conversely, the reverse, raising of the tilted trailer bed results in a corresponding extension of the pivot unit 6 and reverse retraction of the transfer rod 33 with a corresponding return of the bumper arm 22 and bumper plate 20 to the depending bumper position.

Figure 6:
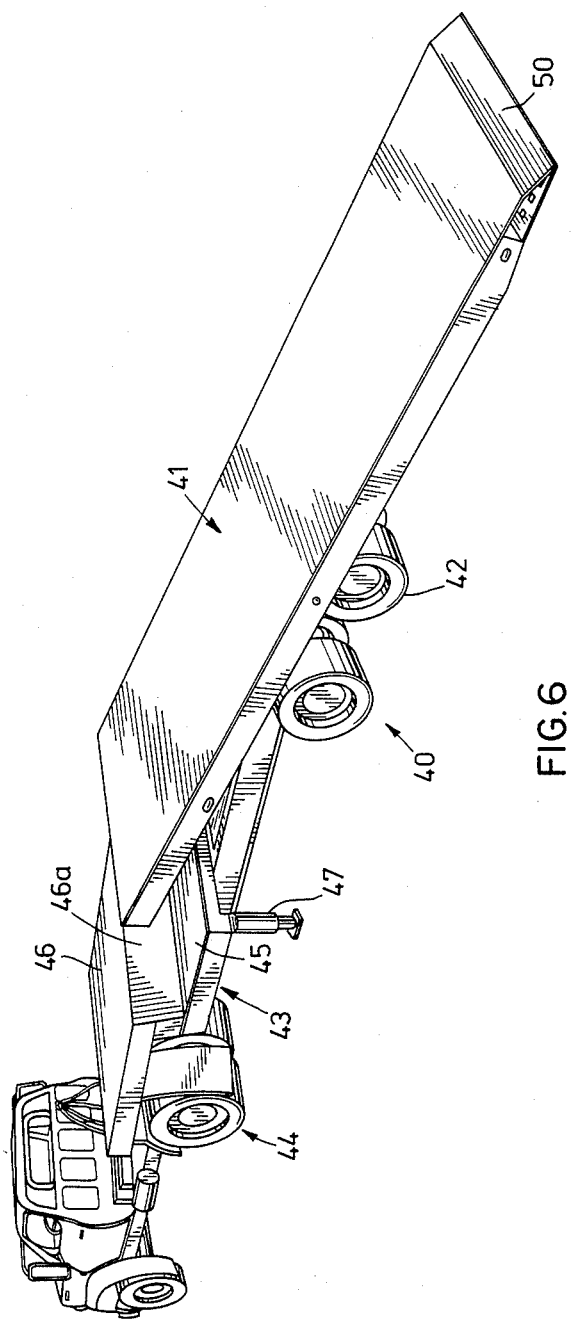
FIG. 6 is a pictorial view illustrating another embodiment of the invention.

Although shown in a separate trailer embodiment, the invention may be used in other trailer constructions having a pivoted end member of a bed and the bumper unit. For example, in FIG. 6 a tilted trailer unit 40 includes a similar pivotally mounted tilt bed 41 coupled to a support wheel structure 42. In FIG. 6, the bed 41 is shown in the tilted position and is movable to the horizontal transport position. The forward end of the wheel structure 42 includes a fixed L-shaped fifth wheel unit 43 for releasable coupling of the trailer 40 to a truck tractor 44 or the like. The fifth wheel unit 43 includes a bed portion 45 secured to the structure 42 as a planar extension of the bed 41. The fifth wheel unit 43 also includes a raised platform 46 connected to bed portion 45 by an angled vertical portion 46a. A latch unit 47 at the abutting ends of the bed portion 45 and the bed 41 releasably holds the bed 41 in the horizontal transport position. Release of the latch unit 47 releases the bed 41 which can then readily tilt, or be tilted to the loading position. A bumper/ramp unit 50 is secured to the aft end of the trailer bed 41 as in the first embodiment, and moves between the depending bumper position and the ramp position as in the first embodiment.

Thus, the mechanical linkage provides a simple reliable and inexpensive system providing positive positioning of the bumper/ramp unit between the desired positions and provides effective locking of the unit in the desired position. Further, all of the components are simple plate and rod-like members which can be readily produced and similarly serviced by the ordinary trailer maintenance shop. The present invention thus provides a highly effective and reliable bumper/ramp unit for a low bed trailer or the like.

Various modes in carrying out the invention are contemplated as being within the scope of the following claims, particularly pointing out and distinctly claiming the subject matter which is regarded as the invention.

I claim:

1. A low-bed trailer adapted to be connected to a powered vehicle comprising,
   a bed structure for supporting a load and including a wheel assembly for transport of said bed structure, connection means attaching a central portion of said bed structure to said wheel assembly, said bed structure extending forwardly of said wheel assembly to a tractor connection and extending rearwardly of said wheel assembly, said connection means permitting pivoting of the bed structure between a substantially horizontal transport position and a tilted loading position,
   a bumper/ramp unit secured to the bed structure and movable between a first position defining a depending position extending substantially downwardly of said bed structure and a second position defining an extension of said bed structure, and
   a separate mechanical linkage means connected to said wheel assembly and to said bed structure and to said bumper/ramp unit and operable by said pivoting of said bed structure to move said bumper/ramp unit between said first and second positions, said separate mechanical linkage being directly moved by pivoting of said bed structure relative to said wheel assembly to move said bumper/ramp unit between said first and second positions in response to positioning said bed structure between said horizontal transport position and said tilted loading position.

2. The low bed trailer of claim 1 wherein said bed structure includes a single continuous bed frame and deck with a front position resting on said wheel assembly for transport of said bed structure, and a rear cantilevered portion extending rearwardly from said connection means, said mechanical linkage means is a pivoting linkage having a first member pivoted to said bed structure and a second member pivoted to said wheel assembly and permitting pivoting of the bed structure between said substantially horizontal transport position and said tilted loading position.

3. The low bed trailer of claim 1 wherein said separate mechanical linkage means includes pivot members connected to said bed structure and to said bumper/ramp unit and a rigid connecting link means between said pivot members and operable to move said bumper/ramp unit between said first and second positions in response to positioning said bed structure between said horizontal transport position and tilted loading position.

4. The low bed trailer of claim 1 wherein said separate mechanical linkage means includes a pivot shaft member having end arms rotatably mounted to said bed structure, a pivot arm affixed to said pivot shaft member, a bracket member secured to said wheel assembly and a pair of collapsible links connected to each other and to said bracket member and a rigid connecting link being connected to said pivot arm and said collapsible links.

5. The low bed trailer of claim 1 wherein the bumper/ramp unit includes an elongated plate, a pivotal connection means between said bed structure and said elongated plate, and said separate mechanical linkage means is operable to pivot said elongated plate between said first and second positions.

6. The low bed trailer of claim 1 wherein the bumper/ramp unit includes a triangular-shaped beam and a pivotal connection means between said bed structure and said triangular-shaped beam, said triangular-shaped beam defining a bottom ground engaging wall in said second position with a top wall extending as an extension from the bed to define an inclined ramp from the ground to the bed structure.

7. The trailer of claim 1 wherein said wheel assembly includes a forward fixed bed section forming an extension of said bed structure in the horizontal transport position.

8. A trailer apparatus adapted to be connected to a powered vehicle comprising,
a bed structure,
a wheel means,
pivot means connecting said bed structure to said wheel means, said bed structure extending forwardly and rearwardly of said pivot means and being positionable from a substantially horizontal transport position to a tilted loading position under the forces of gravity acting on said bed structure,
a bumper/ramp unit secured to the aft end of the bed structure and movable between a first position defining a ramp extension of said bed structure and a second position defining a depending bumper position extending substantially downwardly of said bed structure, and
a separate mechanical linkage means connected to said bumper/ramp unit and to said bed structure to position said bumper/ramp unit between said first and second positions, said separate mechanical linkage being directly moved by pivoting of said bed structure relative to said wheel means to move said bumper/ramp unit between said first and second positions in response to said gravity positioning of said bed structure between said horizontal transport position and said tilted loading position.

9. The trailer apparatus of claim 8 wherein said bumper/ramp unit includes an outer bumper plate which in said first position extends at an angle from said bed structure to define said ramp extension.

10. The trailer apparatus of claim 8 wherein said linkage means includes a pair of collapsible pivotal links secured to the bed structure and to the wheel means. and a transfer member secured to the pivotal links and to the bumper/ramp unit to position the bumper/ramp unit.

11. The trailer apparatus of claim 10 wherein said bumper/ramp unit includes pivot arms pivotally connected to the bed structure, a pivot shaft secured to said pivot arms, and a pivot arm secured to said pivot shaft and to said transfer member.

12. The trailer apparatus of claim 10 or 11 wherein said pivotal links include a pivot arm and a pivot pin pivotally secured to the pivot arm and wheel means and said pivot arm extending rearwardly and upwardly, a pivot plate having a pivot pin pivotally secured to the bed structure substantially in alignment with said first pivot pin, said plate extending rearwardly, said transfer member being a rigid rod having one end pivotally secured to the rearward portion of said plate and extending rearwardly to said bumper/ramp unit.

* * * * *